(12) United States Patent
Chang et al.

(10) Patent No.: US 11,566,112 B2
(45) Date of Patent: Jan. 31, 2023

(54) HIGH-PERFORMANCE TRIPLE-CROSSLINKED POLYMER AND PREPARATION METHOD THEREOF

(71) Applicants: Southwest University of Science and Technology, Mianyang (CN); Sichuan Guanmusiyang New Material Technology Co., Ltd., Mianyang (CN)

(72) Inventors: Guanjun Chang, Mianyang (CN); Li Yang, Mianyang (CN); Yewei Xu, Mianyang (CN); Baoxuan Chang, Mianyang (CN); Shien Yang, Mianyang (CN); Rui Yuan, Mianyang (CN)

(73) Assignees: Southwest University of Science and Technology, Mianyang (CN); Sichuan Guanmusiyang New Material Technology Co., Ltd., Mianyang (CN)

( * ) Notice: Subject to any disclaimer, the term of this patent is extended or adjusted under 35 U.S.C. 154(b) by 239 days.

(21) Appl. No.: 16/853,785

(22) Filed: Apr. 21, 2020

(65) Prior Publication Data

US 2021/0253805 A1  Aug. 19, 2021

(30) Foreign Application Priority Data

Feb. 17, 2020 (CN) .......................... 202010095804.X

(51) Int. Cl.
*C08J 3/24* (2006.01)
*C08G 73/02* (2006.01)

(52) U.S. Cl.
CPC ............ *C08J 3/24* (2013.01); *C08G 73/0206* (2013.01); *C08J 2379/02* (2013.01)

(58) Field of Classification Search
None
See application file for complete search history.

(56) References Cited

U.S. PATENT DOCUMENTS

| 4,428,987 A | * | 1/1984 | Bell | H05K 3/389 205/198 |
| 2010/0279566 A1 | * | 11/2010 | Yang | H01G 4/18 156/308.2 |
| 2013/0142733 A1 | * | 6/2013 | Harth | A61K 47/59 424/9.6 |
| 2019/0330413 A1 | * | 10/2019 | Agrawal | C08L 63/00 |
| 2021/0040269 A1 | * | 2/2021 | Woznicka | C08G 18/61 |

* cited by examiner

*Primary Examiner* — Megan McCulley
(74) *Attorney, Agent, or Firm* — Bayramoglu Law Offices LLC

(57) ABSTRACT

A high-performance triple-crosslinked polymer and a preparation method thereof are provided. The polymer is obtained by curing and cross-linking a monomer having two epoxy groups, a cross-linking monomer and a functional monomer. The polymer contains a cross-linking network formed by covalent bonds and two types of multi-level hydrogen bonds with different strengths. The interaction strength between the covalent bonds and the two types of hydrogen bonds decreases in a gradient. The dilemma of the strength-ductility tradeoff in a high-performance polymer is overcome by forming a triple-crosslinked network with covalent bonds and multi-level hydrogen bonds with different strengths in the polymer. The dynamic and hierarchical hydrogen bonds are broken and recombined timely and continuously to concurrently maintain the complete structure of the polymer network and enable the polymer network to quickly respond to the transmission and dissipation of the external environment.

6 Claims, 4 Drawing Sheets

HIGH-PERFORMANCE TRIPLE-CROSSLINKED POLYMER AND PREPARATION METHOD THEREOF

CROSS REFERENCE TO THE RELATED APPLICATIONS

This application is based upon and claims priority to Chinese Patent Application No. 202010095804.X, filed on Feb. 17, 2020, the entire contents of which are incorporated herein by reference.

TECHNICAL FIELD

The present invention relates to a high-performance polymer, and more specifically relates to a high-performance triple-crosslinked polymer and a preparation method thereof.

BACKGROUND

High-performance polymers have gradually substituted most conventional metal and inorganic materials and been widely used in microelectronics, precision machinery, and aerospace and other aspects because they possess a series of prominent features including excellent high-temperature resistance, perfect corrosion resistance, remarkable mechanical strength lightweight, structural designability, shape adjustability and the like, showing broad application prospects and great commercial value. In recent years, China has achieved great progresses in aerospace, medical equipment, military manufacturing and infrastructure construction, and higher requirements are placed on the performance of related materials. Especially, high-performance polymer materials used as core components in many devices are expected not only to have optimal thermal stability and ideal mechanical strength, but also to possess good tensile ductility. However, traditional high-performance polymer materials hardly meet the above requirements. Therefore, the research and development of novel high-performance polymer materials with more excellent comprehensive properties has become an urgent and valuable scientific problem.

Traditional strategies such as increasing chemical cross-link density and/or adding fillers to polymers can increase mechanical strength at the sacrifice of necessary ductility. In short, increasing strength often results in reduced ductility, and vice versa. For example, supramolecular interactions, such as interactions between hydrogen bond, cation-n interaction, and metal-ligand, have shown significant effects in reducing brittleness because the association and dissociation of the supramolecular interactions can effectively dissipate energy. However, non-covalent supramolecular interactions are much weaker than covalent bond supramolecular interactions, resulting in relatively low mechanical strength. This strength-ductility tradeoff has been a long-standing problem in polymer science. It is necessary to develop a new strategy to endow polymers with both high strength and high ductility.

SUMMARY

The objective of the present invention is to provide a high-performance triple-crosslinked polymer and a preparation method thereof, which solves the existing problem that it is difficult to endow high strength and high ductility to polymers concurrently.

To achieve the above objective, the present invention uses the following technical solutions.

A high-performance triple-crosslinked polymer is obtained by curing and cross-linking a monomer having two epoxy groups, a cross-linking monomer, and a functional monomer. The obtained polymer contains a cross-linking network formed by covalent bonds and two types of multi-level hydrogen bonds with different strengths. The interaction strength between the covalent bonds and the two types of hydrogen bonds decreases in a gradient.

Preferably, the multi-level hydrogen bonds with the different strengths may be formed between the functional monomers as well as between the functional monomer and the monomer having the two epoxy groups; the covalent bonds may be formed between the monomer having the two epoxy groups and the cross-linking monomer as well as between the monomer having the two epoxy groups and the functional monomer.

Preferably, the monomer having the two epoxy groups is an aromatic epoxy resin having a functionality of more than or equal to 2, the cross-linking monomer is a polyamine having a functionality of more than 2, and the functional monomer is a compound containing two functional groups, wherein one of the two functional groups has a functionality of more than or equal to 1 and can form a covalent bond with epoxy by a ring-opening polymerization, and the other one of the two functional groups contains both a hydrogen bond donor and a hydrogen bond acceptor.

Preferably, the monomer having the two epoxy groups is any one selected from the group consisting of bisphenol A epoxy resin and bisphenol F epoxy resin, the cross-linking monomer is any one selected from the group consisting of ethylenediamine, diethylenetriamine, triethylenetetramine, tetraethylenepentamine, 1,6-hexanediamine, methylcyclopentanediamine, m-xylylenediamine, isophoronediamine, and 2-methylpentanediamine, and the functional monomer is 5-amino-1H-benzotriazole.

A method for preparing a high-performance triple-crosslinked polymer, including the following process steps and conditions:

(1) mixing a monomer having two epoxy groups, a cross-linking monomer, and a functional monomer, then dissolving in an appropriate amount of a solvent, and stirring evenly to obtain a mixed solution; and (2) filtering the mixed solution obtained in step (1), then pouring on a clean flat glass, and curing at 60-180° C. and 0-450 Torr for 3-12 hours.

Preferably, a molar ratio of the monomer having the two epoxy groups, the cross-linking monomer, and the functional monomer in step (1) is 10:2.5-4.5:1-5.

Preferably, a molar ratio of the monomer having the two epoxy groups, the cross-linking monomer, and the functional monomer in step (1) is 10:3:4.

Preferably, the solvent is any one selected from the group consisting of N, N-dimethylformamide, N, N-dimethylacetamide, N-methylpyrrolidone, dimethyl sulfoxide, 1,4-dioxane, p-xylene, m-xylene, and acetonitrile.

Compared with the prior art, the advantages of the present invention are as follows.

1. The present invention overcomes the dilemma of the strength-ductility tradeoff in a high-performance polymer by forming a triple-crosslinked network with covalent bonds and multi-level hydrogen bonds with different strengths in the polymer. The dynamic and hierarchical hydrogen bonds are broken and recombined timely and continuous to simultaneously maintain the complete structure of the polymer network and enable the polymer network to quickly respond to the transmission and dissipation of the external environment. Thus, the obtained rigid polymer has high tensile strength and good ductility at the same time.

2. In the present invention, when the polymer is subjected to a small strain, the covalent cross-linking and the two types of hydrogen bonds with different strengths work together to prevent the material from damage. When a relatively large stress is loaded, the energy can be dissipated through the breaking and recombination of the reversible hydrogen bond having a weaker acting force, while the combined action of the hydrogen bond having a stronger acting force and the covalent cross-linking can protect the polymer from damage. When the polymer is further stretched, the two types of multi-level hydrogen bonds with the different strengths work together to transfer and eliminate internal stresses, which allows the polymer film to be stretched a lot without being damaged, because the chemical cross-linking still protects the structural integrity.

3. The addition of the multi-level hydrogen bonds with the different strengths in the polymer of the present invention does not affect the thermal stability of the polymer. The polymer has good thermal stability besides high strength and high ductility.

4. The polymer of the present invention shows good solvent resistance in all common solvents due to the presence of the chemical cross-linking, which has good application prospects.

DETAILED DESCRIPTION OF THE EMBODIMENTS

Figure 1:
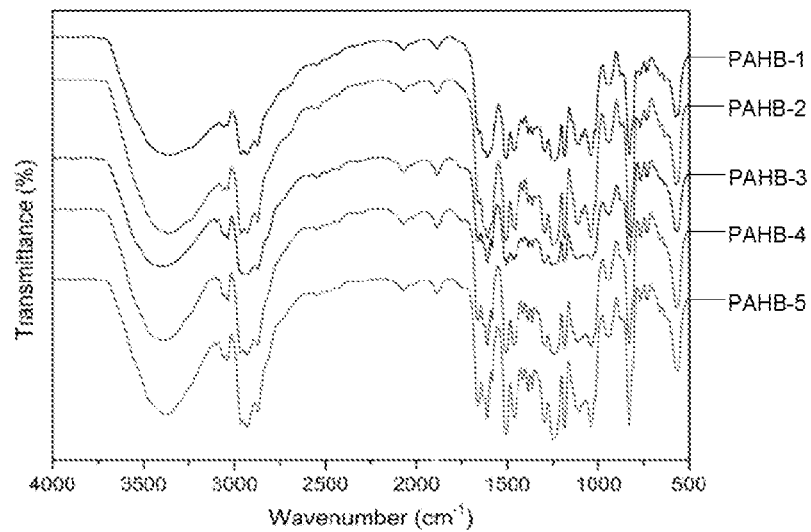
FIG. 1 shows Fourier-transform infrared spectroscopy (FT-IR) spectra of the polymers prepared in Embodiments 1-5.
Figure 2:
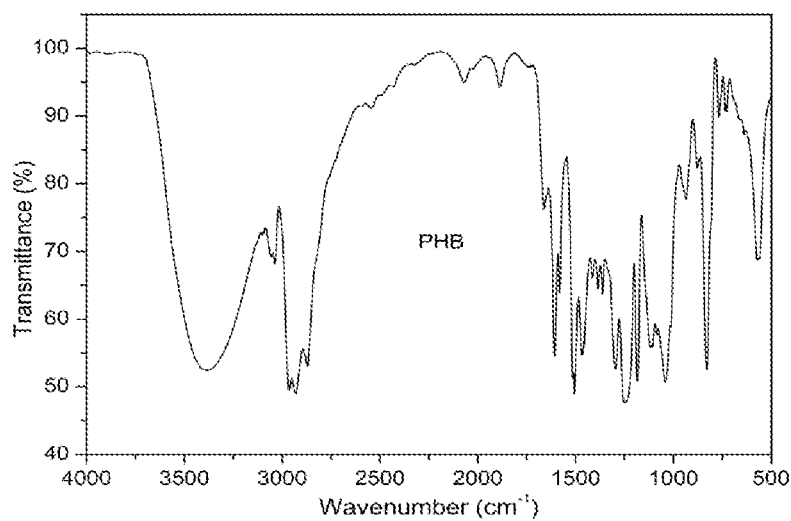
FIG. 2 shown an FT-IR spectrum of the polymer prepared in Comparative Example 1.

The raw materials used in the embodiments of the present invention are as follows:

Original bisphenol A epoxy resin (average epoxy value=0.51) from TCI Development Co., Ltd. is used;

Original 1,6-hexanediamine from J & K Technology Co., Ltd. is used;

Original 5-amino-1H-benzotriazole from J & K Technology Co., Ltd. is used; and

Original 4-aminopyridine from J & K Technology Co., Ltd. is used.

Test methods for related data in the embodiments of the present invention are as follows:

FTIR spectra of the samples are recorded on a Nicolt 6700 Fourier transform infrared spectrometer;

13C solid-state CP/MAS NMR spectra are recorded on an Agilent-NMR-vnmrs 600 spectrometer.

Under nitrogen flow conditions, the glass transition temperature of the polymer is measured by differential scanning calorimetry (DSC) at a rate of 20° C./min.

Under nitrogen atmosphere, thermogravimetric analysis (TGA) is performed on Mettler tga2 at a heating rate of 20° C./min.

At room temperature, a uniaxial tensile test is performed on film-like sample having a size of 58×7 mm by a KD-5 material testing machine at a tensile rate of 1 mm/min and a loading unit of 500N.

At room temperature, and a cyclic loading test is performed by zero-period zero-force cyclic loading at a strain rate $d\varepsilon/dt$ of 0.24 mm/s.

EMBODIMENTS

Preferred implementation solutions within the scope of the present invention are further described and demonstrated by the following embodiments. These embodiments are illustrative and are not to be construed as limiting the present invention.

Embodiment 1

0.2 g of a mixture of bisphenol A epoxy resin, 1, 6-hexanediamine and 5-amino-1H-benzotriazole in a molar ratio of 10:4.5:1 was dissolved in 2.5 mL of N, N-dimethylformamide (DMF) for evenly stirring to form a mixed solution. Then, the mixed solution was poured on a clean flat glass after being filtered and cured at 80° C. and 450 Torr for 12 hours to obtain the polymer sample PAHB-1.

Embodiment 2

The molar ratio of bisphenol A epoxy resin, 1, 6-hexanediamine and 5-amino-1H-benzotriazole was changed to be 10:4:2, and other conditions were the same as those in Embodiment 1. The polymer sample PAHB-2 was obtained.

Embodiment 3

The molar ratio of bisphenol A epoxy resin, 1, 6-hexanediamine and 5-amino-1H-benzotriazole was changed to be 10:3.5:3, and other conditions were the same as those in Embodiment 1. The polymer sample PAHB-3 was obtained.

Embodiment 4

The molar ratio of bisphenol A epoxy resin, 1, 6-hexanediamine and 5-amino-1H-benzotriazole was changed to be 10:3:4, and other conditions were the same as those in Embodiment 1. The polymer sample PAHB-4 was obtained.

Embodiment 5

The molar ratio of bisphenol A epoxy resin, 1, 6-hexanediamine and 5-amino-1H-benzotriazole was changed to be 10:2.5:5, and other conditions were the same as those in Embodiment 1. The polymer sample PAHB-5 was obtained.

To verify that hydrogen bonds with different strengths are necessary conditions to give a polymer high strength and high ductility, Comparative Example 1 (excluding hydrogen bonds) and Comparative Examples 2-5 (having similar structures but containing only covalent cross-linking and relatively weak single hydrogen bond cross-linking) were designed.

Comparative Example 1

0.2 g of a mixture of bisphenol A epoxy resin and 1, 6-hexanediamine is dissolved in 2.5 mL of N, N-dimethylformamide (DMF) to form a homogeneous solution. The mixed solution was poured on a clean flat glass after being filtered and cured at 80° C. and 450 Torr for 12 hours to obtain the polymer sample PHB. The molar ratio of bisphenol A epoxy resin to 1, 6-hexanediamine is 2:1.

Comparative Example 2

0.2 g of a mixture of bisphenol A epoxy resin, 1, 6-hexanediamine and 4-aminopyridine in a molar ratio of 10:4:2 is dissolved in 2.5 mL of N, N-dimethylformamide (DMF) to form a homogeneous solution. The homogeneous solution was poured on a clean flat glass after being filtered and cured at 80° C. and 450 Torr for 12 hours to obtain the polymer sample PYHB-2.

Comparative Example 3

The molar ratio of bisphenol A epoxy resin, 1, 6-hexanediamine and 4-aminopyridine was changed to be 10:3.5:3, and other conditions were the same as those in Comparative Example 2. The polymer sample PYHB-3 was obtained.

Comparative Example 4

The molar ratio of bisphenol A epoxy resin, 1, 6-hexanediamine and 4-aminopyridine was changed to be 10:3:4, and other conditions were the same as those in Comparative Example 2. The polymer sample PYHB-4 was obtained.

Comparative Example 5

The molar ratio of bisphenol A epoxy resin, 1, 6-hexanediamine and 4-aminopyridine was changed to be 10:2.5:5, and other conditions were the same as those in Comparative Example 2. The polymer sample PYHB-5 was obtained.

The polymer samples obtained from Embodiments 1-5 and Comparative Examples 1-5 were characterized by the Fourier transform infrared spectrometer and the Agilent-NMR-vnmrs 600 spectrometer, and the results are shown in FIG. 1, FIG. 2, FIG. 3, and FIG. 4. It can be seen from the FT-IR spectra of FIGS. 1 and 2 that the strong absorption peaks at 2964 cm$^{-1}$ and 2871 cm$^{-1}$ correspond to the tensile vibration, the strong absorption peaks at 1501 cm$^{-1}$ and 1457 cm$^{-1}$ correspond to the bending vibrations of —CH$_2$— and —CH$_3$, the absorption peaks at 1252 cm$^{-1}$ and 1184 cm$^{-1}$ correspond to the stretching vibration of —C—O—C—, and the characteristic absorption peaks of the epoxide ring modes at 920 cm$^{-1}$ and 860 cm$^{-1}$ are missing, which indicates that the expected curing reaction occurred, and the PHB and PAHBs polymers were successfully synthesized.

Figure 3:
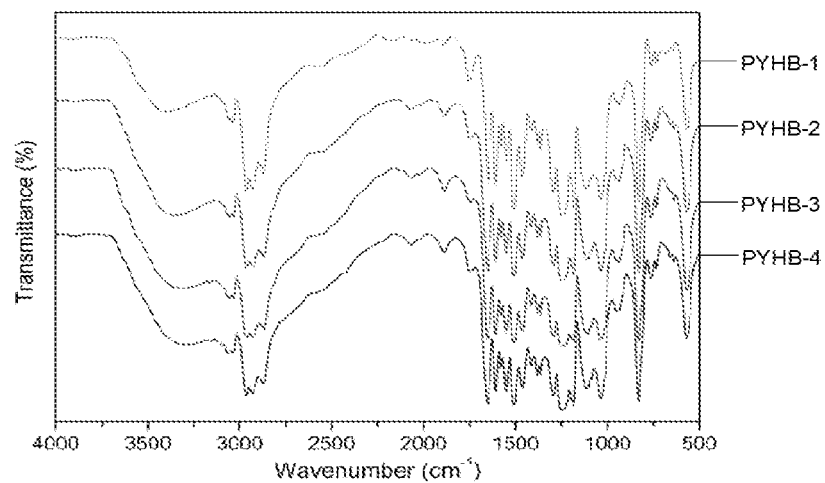
FIG. 3 shows FT-IR spectra of the polymers prepared in Comparative Examples 2-5.
Figure 4:
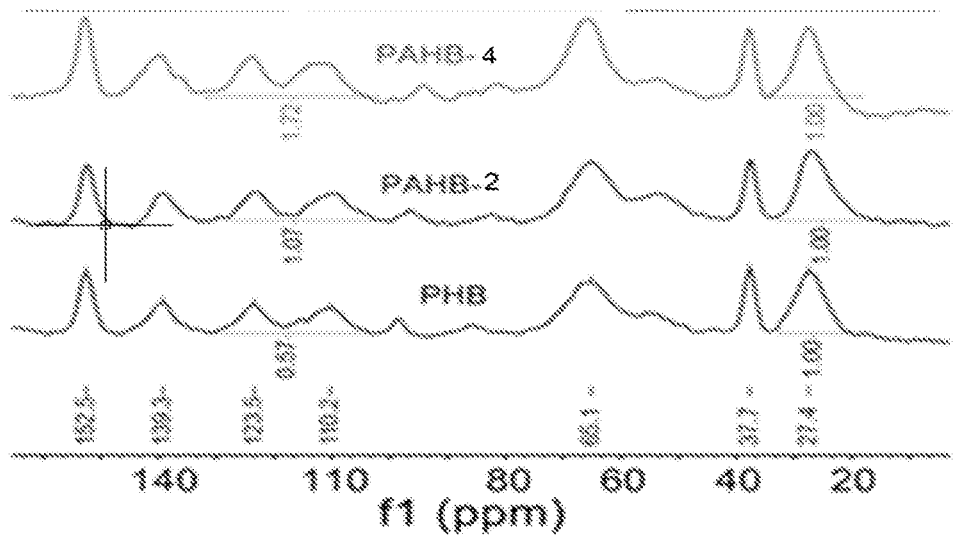
FIG. 4 shows a 13C cross polarization magic-angle spinning (CP/MAS) NMR spectra of the polymers prepared in Embodiment 2, Embodiment 4, and Comparative Example 1.

It can be seen from the FT-IR spectra in FIG. 3 that the strong absorption peaks at 2973 cm$^{-1}$ and 2868 cm$^{-1}$ correspond to the tensile vibration, the strong absorption peaks at 1508 cm$^{-1}$ and 1463 cm$^{-1}$ correspond to the bending vibrations of —CH$_2$— and —CH$_3$, the absorption peaks at 1255 cm$^{-1}$ and 1179 cm$^{-1}$ correspond to the stretching vibrations of —C—O—C—, and no characteristic absorption peaks of the epoxide ring modes are presented near 920 cm$^{-1}$ and 860 cm$^{-1}$, which indicates that the curing reaction proceeded smoothly, and the polymers obtained in Comparative Examples 2-5 were successfully synthesized.

In addition, it can be seen from FIG. 1 that as the content of benzotriazole groups increases, the intensities of the absorption peaks at about 1664 cm$^{-1}$ (the bending vibration of —NH— of the benzotriazole groups) and 828 cm$^{-1}$ (the vibration of C—H of phenyl) in the FT-IR spectra increase. It can be seen from the 13C CP/MAS NMR spectrum of FIG. 4 that as the content of benzotriazole groups increases, the integral area ratio between 123.5-110.2 (phenyl C) and 27.4 ppm (methylene C) increases, which indicates that the benzotriazole groups were effectively introduced into the polymers prepared in the embodiments.

Embodiments 1-5, Comparative Examples 1-5, and conventional polymer materials were subjected to a uniaxial tensile test, and the maximum breaking stress and maximum breaking strain were measured, as shown in Table 1:

TABLE 1

Mechanical properties of embodiments, comparative examples, and conventional polymer materials

| Samples | Tensile strength/ MPa | Breaking elongation % |
|---|---|---|
| PAHB-1 | 68.6 ± 4.71 | 8.4 ± 0.65 |
| PAHB-2 | 77.1 ± 4.28 | 15.3 ± 0.51 |
| PAHB-3 | 77.3 ± 4.63 | 11.7 ± 0.75 |
| PAHB-4 | 117.7 ± 3.13 | 14.93 ± 0.60 |
| PAHB-5 | 75.1 ± 4.03 | 14.2 ± 0.55 |
| PHB | 55.7 ± 4.62 | 5.23 ± 0.83 |
| PYHB-2 | 50.3 ± 5.43 | 6.01 ± 0.63 |
| PYHB-3 | 78.0 ± 4.82 | 10.84 ± 0.77 |
| PYHB-4 | 80.2 ± 5.26 | 9.41 ± 0.74 |
| PYHB-5 | 78.7 ± 5.03 | 9.18 ± 0.59 |
| Epoxy resin | 76.1 | 3.97 |
| Aromatic polyimide (PI) | 115 | 10.6 |
| Polyaryletherketone (PAEK) | 105.7 | 8.90 |
| Polyetherimide (PEIS) | 99 | 5.02 |
| Polylactic acid (PLA) | 65.5 | 2.49 |

It can be seen from Table 1 that as the content of benzotriazole groups increases, the tensile strength and breaking elongation also increase simultaneously. In particular, the polymer sample PAHB-4 prepared in Embodiment 4 has the maximum breaking stress and maximum breaking strain, which are 117.7 MPa and 14.93%, respectively. Therefore, the molar ratio of the raw materials in Embodiment 4 is the optimal molar ratio, and the comprehensive performance of the PAHB-4 polymer is the highest. In the present invention, the effect of the ratio of covalent bonds to hydrogen bonds in the polymer system on the properties of the polymer is investigated by adjusting the content of the benzotriazole groups in the polymer system.

The tensile strength and ductility of the polymer sample PAHB-4 obtained in Embodiment 4 are significantly higher than those of the traditional epoxy resin, aromatic polyimide (PI), polyaryletherketone (PAEK), polyetherimide (PEIS), and polylactic acid (PLA), which proves that the polymer prepared by the present invention has higher tensile strength and better ductility than traditional polymer materials. Moreover, the tensile strength and breaking elongation of the polymer sample PAHB-4 are much higher than those of the polymer sample MB prepared in Comparative Example 1 and the polymer samples prepared in Comparative Examples 2-5, which indicates that the multi-level hydrogen bonds with different strengths in the polymer network is a necessary condition for giving PAHBs polymers excellent tensile strength and ductility.

Figure 5:
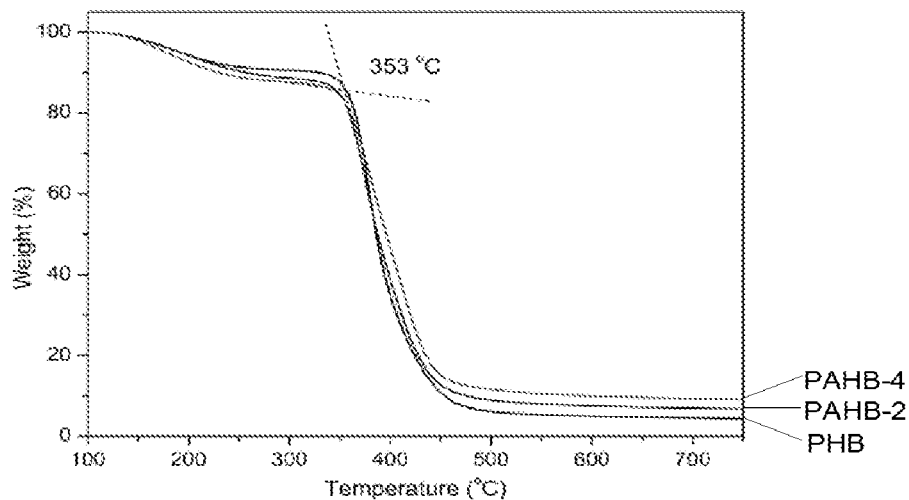
FIG. 5 shows thermogravimetric curves of Embodiment 2, Embodiment 4, and Comparative Example 1.
Figure 6:
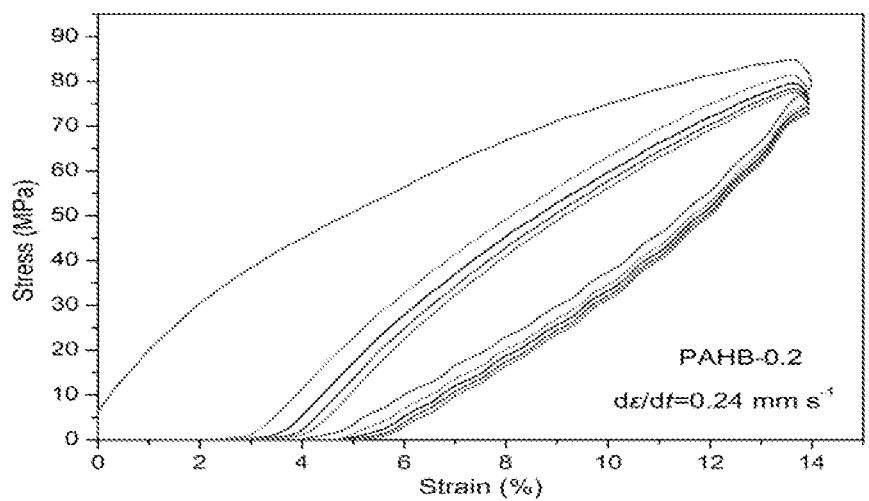
FIG. 6 shows a cyclic stress-strain curve of the polymer prepared in Embodiment 2 at a strain rate $d\varepsilon/dt=0.24$ mms$^{-1}$.
Figure 7:
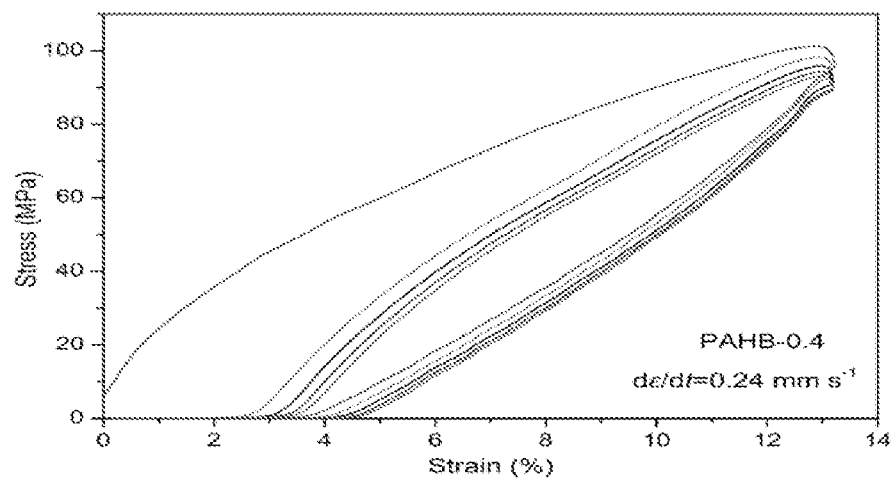
FIG. 7 shows a cyclic stress-strain curve of the polymer prepared in Embodiment 4 at a strain rate $d\varepsilon/dt=0.24$ mms$^{-1}$.

To further investigate the properties of the polymers, the polymers prepared in Comparative Example 1, Embodiment 2 and Embodiment 4 were subjected to the thermogravimetric analysis (TGA) and differential scanning calorimetry (DSC) measurement, and the solvent resistance of the polymers prepared in Embodiments 1-5 were tested, and the results are shown in FIG. 5, FIG. 6, FIG. 7 and Table 2.

It can be seen from FIG. 5 that when the thermal decomposition temperature (TDS) is above 350° C., all polymers have good thermal stability to meet the experimental requirements under normal circumstances, which indicates that replacing the chemical crosslinked part with hydrogen bonds does not affect the thermal stability.

It can be seen from FIGS. 6 and 7 that the cyclic stress-strain curves of the multi-cycle PAHB-2 and PAHB-4 films at the strain rate dε/dt of 0.24 mms$^{-1}$ indicate that the polymers PAHBs have good cycle performance.

TABLE 2

Solvent resistance of PAHBs

| Polymers | Solvents | | | | | |
|---|---|---|---|---|---|---|
| | DMAc | DMSO | DMF | NMP | THF | Chloroform |
| PAHB-1 | — | — | — | — | — | — |
| PAHB-2 | — | — | — | — | — | — |
| PAHB-3 | — | — | — | — | — | — |
| PAHB-4 | — | — | — | — | — | — |
| PAHB-5 | — | — | — | — | — | — |

— represents the polymer cannot be dissolved. DMF is N, N-dimethylformamide, DMAc is N, N-dimethylacetamide; NMP is N-methylpyrrolidone, DMSO is dimethyl sulfoxide, THF is tetrahydrofuran, and Chloroform is trichloromethane.

As can be seen from Table 2, due to the presence of chemical cross-linking in the polymers prepared in Embodiments 1-5, these polymers exhibit good solvent resistance in common solvents.

What is claimed is:

1. A method for preparing a high-performance triple-crosslinked polymer comprising the following steps:
   (1) mixing a monomer having two epoxy groups, a cross-linking monomer and a functional monomer to obtain a mixture, then dissolving the mixture in a predetermined amount of a solvent to obtain a mixed solution, and stirring the mixed solution evenly, and
   (2) filtering the mixed solution obtained in step (1) to obtain a filtered mixed solution, then pouring the filtered mixed solution on a clean flat glass, and curing the filtered mixed solution at 60-180° C. and 0-450 Torr for 3-12 hours,
   wherein
   the high-performance triple-crosslinked polymer is obtained by cross-linking a monomer having two epoxy groups, a cross-linking monomer, and a functional monomer;
   a molar ratio of the monomer having the two epoxy groups, the cross-linking monomer, and the functional monomer is 10:(2.5-4.5):(1-5);
   the high-performance triple-crosslinked polymer contains a cross-linking network formed by three bonds including a covalent bond, a first hydrogen bond, and a second hydrogen bond; and
   the first hydrogen bond and the second hydrogen bond have different strengths.

2. The method for preparing the high-performance triple-crosslinked polymer according to claim 1, wherein
   the first hydrogen bond is formed between the functional monomers, and the second hydrogen bond is formed between the functional monomer and the monomer having the two epoxy groups;
   a first part of the covalent bond is formed between the monomer having the two epoxy groups and the cross-linking monomer, and a second part of the covalent bond is formed between the monomer having the two epoxy groups and the functional monomer.

3. The method for preparing the high-performance triple-crosslinked polymer according to claim 2, wherein
   the monomer having the two epoxy groups is an aromatic epoxy resin having a functionality of at least 2,
   the cross-linking monomer is a polyamine having a functionality of more than 2, and
   the functional monomer is a compound containing two functional groups,
   wherein a first functional group of the two functional groups has a functionality of at least 1 and forms the covalent bonds with epoxy by a ring-opening polymerization, and
   a second functional group of the two functional groups contains both a hydrogen bond donor and a hydrogen bond acceptor.

4. The method for preparing the high-performance triple-crosslinked polymer according to claim 3, wherein
   the monomer having the two epoxy groups is one selected from the group consisting of bisphenol A epoxy resin and bisphenol F epoxy resin,
   the cross-linking monomer is one selected from the group consisting of ethylenediamine, diethylenetriamine, triethylenetetramine, tetraethylenepentamine, 1, 6-hexanediamine, methylcyclopentanediamine, m-xylylenediamine, isophoronediamine, and 2-methylpentanediamine, and
   the functional monomer is 5-amino-1H-benzotriazole.

5. The method for preparing the high-performance triple-crosslinked polymer according to claim 1, wherein the molar ratio of the monomer having the two epoxy groups, the cross-linking monomer, and the functional monomer in step (1) is 10:3:4.

6. The method for preparing the high-performance triple-crosslinked polymer according to claim 1, wherein the solvent in step (1) is one selected from the group consisting of N, N-dimethylformamide, N, N-dimethylacetamide, N-methylpyrrolidone, dimethyl sulfoxide, 1, 4-dioxane, p-xylene, m-xylene, and acetonitrile.

\* \* \* \* \*